United States Patent Office 3,711,291
Patented Jan. 16, 1973

3,711,291
JUICY SAUSAGE ANALOG
Harold T. Leidy, New City, N.Y., Charles M. Kerrigan, Wayne, N.J., and Robert T. Tewey, Dobbs Ferry, and Louis Bartenbach, Thornwood, N.Y., assignors to General Foods Corporation, White Plains, N.Y.
No Drawing. Filed Aug. 20, 1970, Ser. No. 65,716
Int. Cl. A23j 3/00
U.S. Cl. 99—17   4 Claims

ABSTRACT OF THE DISCLOSURE

A juicy sausage meat analog is formed from a heat set protein gel that has incorporated non-rendered animal fatty tissue.

BACKGROUND OF THE INVENTION

This invention is directed to the formation of meat analogs wherein a heat set vegetable protein is formulated to substitute for a proteinaceous meaty material. In the invention of the disclosure, a preferred analog, a sausage-type product is made that resembles a meat composition that is formed from ingredients processed into an emulsion system.

Extensive development has been undertaken in recent years to formulate meat substitutes from vegetable materials that are concentrated in protein. By appropriate processing steps and with different formulations a source of vegetable protein may be substituted for a proteinaceous meaty material.

Boyer, U.S. Pat. No. 2,682,466, patented June 29, 1954, teaches the formation of synthetic meat products employing quantities of vegetable protein filaments. These protein filaments are made by forcing a colloidal protein dispersion through a porous membrane, such as a spinnerette, into a coagulating bath causing precipitation in filament form. The filaments are assembled into a meat-like product by employing binding materials, including cereals and protein. The product may resemble filet mignon, turkey or chicken.

Anson and Pader, holders of numerous U.S. patents, including U.S. Pats. Nos. 2,802,737; 2,813,024; 2,813,025; 2,830,902 and 2,833,651, patented in either 1957 or 1958, disclose protein containing products resembling meat. These patentees teach formation of a "chewy protein gel," wherein various techniques to form meat-like products are taught. The chewy protein gel is made by adjusting a gel precursor such as soy or peanut concentrates to a pH of above 6.0, followed by heating to convert to the chewy protein gel. Various additives including protein filaments, doughs, flavoring ingredients, etc., may be incorporated in the synthetic meat products.

Kjelson, U.S. Pat. No. 3,343,963, patented Sept. 26, 1967, teaches formation of high protein food products resembling chopped ground meats. A source of spun edible protein fibers is bound together with a binder consisting of albumen, gluten and particulate oilseed material. The composition is heat set to form the simulated meat product.

More recently, Hartman, U.S. Pat. No. 3,320,070, patented May 16, 1967, has taught manufacture of bacon-like products from man-made fibers of natural vegetable protein with a binder including albumen and an edible proteinate. The bacon-like product is formulated with lean and nonlean portions so that the real meat product is resembled.

SUMMARY OF THE INVENTION

The present invention is formulated with proteinaceous vegetable material to substitute and resemble sausage foods made from a meat-containing emulsion which is heat-cured to a stable physical form. Foods such as bologna, olive loaf, frankfurters, etc., are essentially duplicated by the analogs of this invention. More specifically, the primary product in the class of sausage-type products to be duplicated are frankfurters or so-called hot dogs. In this type of sausage unique problems exist in analog formation since a moist, juicy product is needed with substantial bounce qualities when the food is bitten upon consumption.

The required constituent in the manufacture of the disclosed food is a concentrated source of vegetable protein with an additional component of a non-rendered animal fatty tissue. The protein source, together with water, is processed into a gel system by the application of heat. The formation of the gel system from the vegetable proteinaceous material is a necessary part of this disclosure. The gel form is considered permanent, that is, in normal food use including refrigeration and warming to heat temperature, the formed product will retain its shape. It has been additionally found that for a high degree of juiciness coupled with bounce qualities, a non-rendered animal fatty tissue is essential.

A non-vegetable gel source in addition to the vegetable proteinaceous material may be employed from gel precursors of albumen, casein and whey. The gel system produced by the combination of materials is considered to be superior from consumer considerations.

The present sausage analogs may have various additives blended in the gel precursor prior to the heat operation. Included as suitable ingredients are flavors, starches, emulsifiers, coloring materials, gums and other proteinaceous materials such as gelatin, which complete and balance the analog.

DETAILED DESCRIPTION OF THE INVENTION

Initially, it is necessary to define exactly what is encompassed within the meaning of a sausage analog since the present invention deals with a specific area in imitation meat products. A sausage analog duplicates as closely as possible a meat product that is initially formed into an emulsion system, shaped, and heated to solidify to a stable physical form. The sausage analog with its protein gel system together with entrapped additives duplicates in function the solidified meat emulsion.

A sausage contrasts directly and is distinct from a "steak-type" meat which is considered herein to be a system with a substantial amount of fibers bound together in a matrix. Thus, a sausage or sausage analog would not resemble for example material meat cuts such as steak, pork chops or pots roast meats. Additionally, changing the physical characteristics of a natural meat such as by grinding or chopping, e.g. hamburger or ground ham, does not produce a sausage-type product.

To employ positive language in defining a sausage analog, this food is formulated and processed to duplicate as closely as possible meat products that are initially formed into an emulsion. The meat emulsion system is heated which results in gelation introducing a degree of rigidity. The initial meat emulsion with its water component has flow characteristics so that it may be readily shaped, as in a casing, prior to the gelation to a stable physical form. Examples of such sausages are bologna, olive loaf, frankfurters, etc. In the present invention, it is this type of meat sausage which is duplicated by using other ingredients. Similarities in the function of the initial formulations as well as in process steps exist in comparing a sausage meat with a sausage analog.

The vegetable proteinaceous material of the analog together with its water component is the counterpart of the meat emulsion system. In both the sausage and sausage analog the initial ingredients have flow characteristics and may be shaped readily as in a casing. Thereafter both systems would be heated which results in gelation of a stable physical shape. Thus, process equipment from the meat industry in producing sausage meat products may be employed directly in the manufacture of the sausage analog.

In the sausage analog the protein gel constituent derived from an initial protein dispersion dominates to a significant degree the product mass. However, in the present analog system it has been found that a non-rendered animal fat is essential and must be mixed into the protein dispersion prior to gelation by heating. As employed herein, a proteinaceous dispersion signifies the protein material being present in a liquid carrier preferably water either in solution and/or suspension.

The use of non-rendered fatty animal tissue is necessary if optimum juiciness is to be introduced into the product. Some sausage products, such as frankfurters, require high juiciness for optimum consumer acceptance. It has been found that if a fat or oil that is rendered, the use of the vegetable protein, particularly an oil seed protein as soy, acts as an emulsifier and ties the fat or oil into the composition. Thus, when the product is eaten even substantial levels of fat and water tend to result in a product with a degree of dryness. In contrast non-rendered animal fatty tissue possesses a cellular structure. Even with the fatty tissue finally ground the cellular structure remains. Upon mixing with the components of the sausage analog this non-rendered fatty tissue has a quality of remaining as a distinct entity. Upon heating to cause gelation of the protein gel precursor the initial non-rendered fatty tissue will remain in essential particle form, thus giving concentrations of this fatty component throughout the product. A preferred example of the non-rendered animal fat is suet, such as beef suet. Due to these particles or minute pockets of animal tissue, the juiciness quality is imparted to the sausage analog. Additionally, the presence of these fat pockets appears to give rise to a readier water release from the solids content of the matrix.

Preferably, the animal fatty tissue is ground to a fine size in order to avoid extremely large globules in the analog. Grinding equipment, such as a Hobart Silent Cutter, Alpine Pinmill, or Fitzpatrick Commuter Mill may be employed. It has been found that chilling the fatty tissue prior to grinding aids in retaining the fat cellular structure, since grinding introduces heat into the fatty tissue and excessive heat causes rendering. Additionally, to minimize the temperature elevation with commercial grinding equipment, the non-rendered animal fatty tissue is preferably frozen prior to comminution. While any use of fatty animal tissue will introduce an increase in juiciness, a concentration of above about 5% is preferably employed. For a substantial increase in juiciness, as a practical matter, the uppermost non-rendered animal fatty tissue concentration will be about 30% (by weight).

The amount of water in the final product will determine whether a dry, intermediate or wet sausage is to be duplicated. Water contents between about 42 to 74% have been found acceptable with an optimum range of 52 to 65%. At lower moisture contents a drier-type sausage will be obtained. At higher moisture contents a wetter sausage will be produced with a more ready release of flavor components in the liquid phase due to the presence of the animal fatty tissue. However, the use of non-rendered fat is needed in conjunction with the water to permit ready release from the solids matrix.

In the sausage-type product it is considered that the protein gel constituent together with its needed non-rendered animal fatty tissue dominate a significant portion of the product with added ingredients merely enhancing the composition. A required source of protein is from a concentrated vegetable material, as for example, oil seeds, and may include soy, peanuts, cotton seed, peas, etc. The vegetable protein is in concentrated form and is preferably bland, that is, as in the case of soy, unwanted flavors and oils are removed. Concentrated protein materials are readily available in commercial form, such as isolates, concentrates and flour.

The vegetable proteinaceous material in concentrated form, as employed herein, is distinguished by the characteristic and quality that upon heating in a water carrier gelation to a stable physical form occurs. As in typical gel systems, a degree of rigidity is introduced, coupled with elasticity and resilience. Ordinarily, the protein content based on the weight of protein vegetable material will be above about 30% based on the solids content. No upper limit on the maximum protein content exists and protein concentrations above 95% are satisfactory and desirable.

In the formation of the gel constituent satisfactory results occur when the primary gel constituent is derived from the vegetable protein material. However, superior results occur when at least some additional non-vegetable source of protein is employed which also gels upon heating. These sources of protein are albumen, casein and whey or combinations thereof and yield a product that closely resembles and duplicates meat-containing sausage products.

The concentrations by weight of the gelable constituents namely the vegetable protein material in conjunction with the albumen, casein, whey and combinations are critical if the final product is to possess a superior gel system. Since the concentration of the vegetable material may vary dependent on the degree of refinement, the critical ratio of materials is given on the basis of the protein content of the vegetable material.

The minimum concentrations of vegetable protein to albumen, casein and whey would be of the order of about 3.4:1, 5:3 and 1:1 respectively. With combinations of albumen, casein and whey, the minimum concentration of vegetable material is intended to encompass a weighted total of these added gel precursors.

The maximum vegetable protein concentration to these added gel components will be of the order of about 40 to 1.

When using component combination of vegetable proteinaceous material with the added albumen, casein and whey, it is required that the combination of these components be mixed prior to the heat set operation causing gelation. Vegetable protein components as well as albumen, casein or whey may be heat set alone, but the gel of the present disclosure for a superior quality sausage analog would not be obtained. With complete non-uniformity a product containing separate heterogenous gel phases would be obtained, as opposed to the gel system disclosed.

As employed herein, a gel is employed in its normal definition, that is, a solid or semi-solid system of protein in colloidal dimensions in a carrier liquid which is preferably water.

To complete the desired flavor characteristics and appearance flavorings, spices and coloring components are highly desirable. The suorce components, including the gel precursor, the non-rendered animal fatty tissue, water, filler, flavorings, spices and color components are mixed prior to the heating operation which causes gelation to stable physical system. Elevated temperatures, preferably in the range of about 150° F. to about 350° F., will cause the gel to form. The optimum gelation temperatures are considered to lie above the boiling point of water and the preferred heating technique is by an autoclaving operation employing elevated pressure.

To further illustrate the innovative aspects of this invention the following examples are provided.

Example I

To form a juicy frankfurter-type analog the following constituents were employed:

| | |
|---|---:|
| Soy isolate (30% solids) | 43.1 |
| Wheat gluten/soy grits/flour mixture (expanded filler with ammonium bicarbonate) (30% solids) | 21.1 |
| Water | 14.0 |
| Beef suet | 13.5 |
| Soybean oil | 1.5 |
| Albumen | 1.0 |
| Seasoning/flavor/color | 5.8 |

The expanded filler material is a high protein constituent containing wheat gluten/soy grits/flour. This expanded filler is made by mixing the source constituents with a water concentration of about 25%. Ammonium bicarbonate at a concentration of about 0.6% is employed since this material increases the expansion effect during the processing. The residual ammonium bicarbonate concentration will approach 0%. The constituents are fed into an inlet of a heated Model X-25 Wenger Extruder wherein the mix is subjected to elevated temperature and pressure by a revolving screw in the extruder barrel. The constituents are extruded through two 3/8" diameter dies with a recorded pressure of approximately 150 p.s.i.g. and a temperature of approximately 300° F. at the die face. The material is soaked with excess water removed to give a final solids content of 30%, and the material is comminuted prior to subsequent mixing with the component.

The soy isolate which has a pH of 6.2 and is at a concentration of 30% solids is blended with the soy grits/wheat gluten/flour as well as with water, soy bean oil, albumen, seasoning flavor and color in a Silent Cutter. The quantity of water added at this stage of processing is sufficient to permit the ingredients being blended uniformly with comminution.

The beef suet tissue has been prechilled at a temperature of 0° F. and finely ground in a Hobart-type Silent Cutter. The prechilling of the tissue aids in retaining the cellular structure when the fatty tissue is finely ground.

The beef suet animal fatty tissue is slowly added to the ingredients in the Silent Cutter and comminution proceeds for a ten-minute interval. The remaining water is added to obtain a moisture content of 61% and comminution continues for an additional 5 minutes.

The formed slurry of all the source ingredients is stuffed in a conventional frankfurter-type casing, linked and autoclaved. The conditions in the autoclave are at a pressure of 8 to 10 p.s.i.g. and these conditions are maintained for a period of about 15 minutes. After refrigeration the sausage analog casing is removed. This analog which resembles a frankfurter, is warmed to eating temperature and subjected to mechanical pressure.

A ready water release from the matrix is obtained. The analog closely resembles a high quality meat-type frankfurter upon consumption. The analog when bitten, upon consumption, exhibits the property of being highly juicy.

Example II

The ingredients, relative percentages and processing conditions of Example I were duplicated except that rendered animal beef fat was employed in place of beef suet of Example I.

The final product of Example II when compared to Example I did not obtain a ready water release after being warmed and subjected to mechanical pressure. Upon consumption the Example II frankfurter was considerably less juicy than the Example I frankfurter.

What is claimed is:

1. A process for preparing a food product which simulates meat products prepared from meat emulsions which comprises:
    (a) uniformly blending together
        (1) a gel precursor consisting of a non-fibrous vegetable protein and a material selected from the group consisting of albumen, casein, whey and mixtures thereof, said vegetable protein being present above about 30% by weight of the gel precursor and wherein the minimum weight ratio of the vegetable protein to albumen, casein and whey is in the range of about 3.4:1, 5:3, and 1:1 respectively or a weighted total for mixtures thereof and wherein the maximum weight ratio of vegetable protein to albumen, casein, whey or combinations thereof is about 40:1,
        (2) a comminuted non-rendered animal fat in an amount ranging from about 5% to about 30% by weight of the total blend,
        (3) small, but effective amounts of flavorings, spices and coloring components to impart to the blend a taste and color similar to those of a sausage-type meat product,
        (4) a filler material in the form of particles of an expanded high protein source mixture of wheat gluten, soya grits, and flour in an amount of about 6% by weight of the blend, and
        (5) water, in an amount ranging from about 42% to about 74% by weight of the total blend;
    (b) shaping the mixture of (a) to a desirable form; and
    (c) heating the mixture to set the gel to a stable physical form,
whereby the heat set gel resembles a sauge meat product in appearance, flavor, and texture.

2. The process of claim 1 wherein said non-rendered animal fat is suet.

3. The process according to claim 2 wherein said suet is beef suet.

4. A simulated sausage meat product consisting essentially of a shaped, heat-set gel, said gel consisting of a uniform mixture of:
    (a) non-fibrous vegetable protein and a material selected from the group consisting of albumen, casein, whey and mixtures thereof, said vegetable protein being present above about 30% by weight of the gel and wherein the minimum weight ratio of the vegetable protein to albumen, casein, and whey is in the range of about 3.4:1, 5:3, and 1:1 respectively or a weighted total for mixtures thereof and wherein the maximum weight ratio of vegetable protein to albumen, casein, whey or combinations thereof is about 40:1,
    (b) a comminuted non-rendered animal fat in an amount ranging from about 5% to about 30% by weight of the total mixture,
    (c) small, but effective amounts of flavorings, spices and coloring components to impart to the mixture a taste and color similar to those of a sausage-type meat product,
    (d) a filler material in the form of particles of an expanded high protein source mixture of wheat gluten, soya grits, and flour in an amount of about 6% by weight of the blend, and (e) water in an amount ranging from about 42% to about 74% by weight of the total mixture, whereby the heat-set gel resembles a sausage meat product in appearance, flavor and texture.

References Cited
UNITED STATES PATENTS

| | | | |
|---|---|---|---|
| 3,607,860 | 9/1971 | Yamato | 260—123.5 |
| 3,063,842 | 11/1962 | Podebradsky | 99—109 |
| 3,320,070 | 5/1967 | Hartman | 99—17 |
| 2,813,025 | 11/1957 | Anson | 99—14 |

A. LOUIS MONACELL, Primary Examiner

R. B. ANDEWELT, Assistant Examiner

U.S. Cl. X.R.

99—109